United States Patent [19]
Nakaoka

[11] Patent Number: 5,777,794
[45] Date of Patent: Jul. 7, 1998

[54] IMAGE DISPLAY APPARATUS

[75] Inventor: Masaya Nakaoka, Hachioji, Japan

[73] Assignee: Olympus Optical Co., Ltd., Tokyo, Japan

[21] Appl. No.: 719,445

[22] Filed: Sep. 25, 1996

[30] Foreign Application Priority Data

Sep. 26, 1995 [JP] Japan ................................. 7-247736

[51] Int. Cl.⁶ .............................. G02B 27/14; G09G 5/00
[52] U.S. Cl. ....................... 359/632; 359/630; 359/631; 359/633; 345/7
[58] Field of Search ........................ 359/630–633; 345/7–9

[56] References Cited

U.S. PATENT DOCUMENTS

| | | |
|---|---|---|
| 4,269,476 | 5/1981 | Gauthier et al. . |
| 4,805,988 | 2/1989 | Dones . |
| 4,808,978 | 2/1989 | Vernay .................. 340/705 |
| 4,961,625 | 10/1990 | Wood et al. ................ 359/630 |
| 5,034,809 | 7/1991 | Katoh . |
| 5,546,227 | 8/1996 | Yasugaki et al. ......... 359/630 |
| 5,596,433 | 1/1997 | Konuma .................. 359/631 |

FOREIGN PATENT DOCUMENTS

| | | |
|---|---|---|
| 3-191389 | 8/1991 | Japan . |
| 6-250113 | 9/1994 | Japan . |

Primary Examiner—Georgia Y. Epps
Assistant Examiner—Evelyn A. Lester
Attorney, Agent, or Firm—Cushman Darby & Cushman IP Group of Pillsbury Madison & Sutro LLP

[57] ABSTRACT

A compact and lightweight head- or face-mounted image display apparatus in which curvature of field is reduced to improve visibility without using a relay optical system or a prism. The image display apparatus has an image display device (1) and an optical system for leading an image displayed by the image display device (1) to an observer's eyeball (5) without effecting image formation on the way to the observer's eyeball (5). The image display device (1) and the optical system are retained on an observer's head or face by a retaining device. Light rays from the image display device (1) are reflected by a semitransparent surface (2) and then reflected by a reflecting surface (4) of a back-coated mirror (3). Thereafter, the light rays pass through the semitransparent surface (2) to enter the observer's pupil (5).

9 Claims, 10 Drawing Sheets

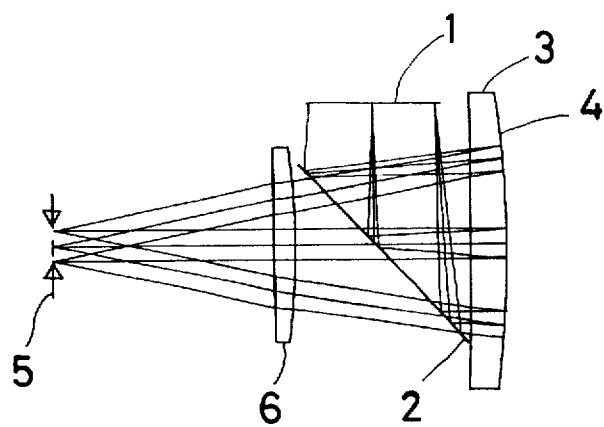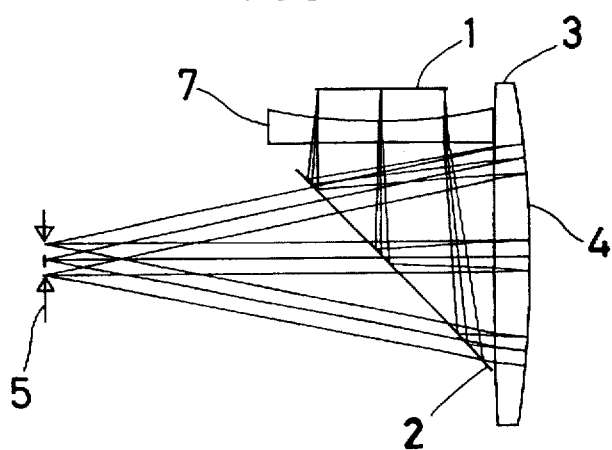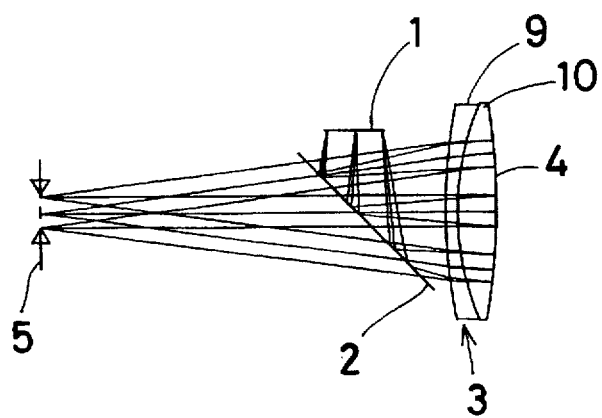

A: Standard interpupillary distance

B: Interpupillary distance shorter than standard

Image fusing position $L = \infty$ d < L < ∞

1

IMAGE DISPLAY APPARATUS

BACKGROUND OF THE INVENTION

The present invention relates to an image display apparatus and, more particularly, to a head- or face-mounted image display apparatus fitted on a user's head or face to enable the user to enjoy watching, for example, an image photographed with an imaging device such as a CCD, or computer graphics.

Hitherto, display devices, e.g. CRTs, LCDs (Liquid Crystal Displays), etc., for displaying television or computer images have been demanded to have a wider image display area and higher resolution in order to satisfy observers' desire to enjoy watching images of enhanced dynamic presence in an even more absorbed state. In recent years, various large-sized display devices have been developed to provide the effect of virtual reality. These display devices are also required to provide a wide field angle and high resolution.

Even with a small-sized display device, if the image display area can be observed as an enlarged image, the observation field angle increases. Consequently, the dynamic presence of the image for observation is enhanced, and the observer can get absorbed in watching it. Moreover, the virtual reality effect can be obtained. Accordingly, a variety of compact head- or face-mounted image display apparatuses have been developed.

Incidentally, when parallel rays of light, that is, light rays from an object point at infinity, are incident on a surface-coated reflecting mirror having a radius R of curvature, the reflecting mirror forms an image which is curved along a circular arc having a radius R/2 and centered at the center of curvature of the reflecting mirror. Therefore, if a head-mounted image display apparatus comprises only a concave reflecting mirror without using a relay optical system, as disclosed in Japanese Patent Application Unexamined Publication (KOKAI) No. 3-191389, curvature of field becomes unfavorably large.

When there is curvature of field in an observation optical system, the observer will adjust the diopter of his/her eyes in accordance with the field curvature. However, when the amount of field curvature is large, it may exceed the diopter adjustable range. In such a case, the diopter cannot satisfactorily be adjusted. Alternatively, the field curvature may cause the observer to feel a sense of incongruity and degrade the visibility of the image. Accordingly, it is demanded to reduce field curvature depending upon the use application or conditions of usage.

To solve the problem of field curvature, an optical system using a relay optical system to reduce field curvature has been proposed, as disclosed in U.S. Pat. No. 4,269,476. However, an arrangement that uses a relay optical system causes the overall size of the apparatus to increase. For an image display apparatus mounted on a user's head or face, it is important to reduce the size and weight of the apparatus from the viewpoint of enabling the apparatus to be comfortably mounted on the user's head or face.

If a prism is used to construct an optical system, as disclosed in Japanese Patent Application Unexamined Publication (KOKAI) No. 6-250113, light rays pass through a medium having a refractive index larger than 1. Therefore, the position of an image display device must be set apart from the optical system, which causes the overall size of the apparatus to increase. This problem is particularly notable when the observation field angle is narrow. Moreover, the use of a prism causes the weight of the apparatus to increase unfavorably.

SUMMARY OF THE INVENTION

In view of the above-described problems of the conventional techniques, an object of the present invention is to provide a compact and lightweight head- or face-mounted image display apparatus in which curvature of field is reduced to improve visibility without using a relay optical system or a prism.

According to a first aspect of the present invention, there is provided a head- or face-mounted image display apparatus including an image display device and an optical system for leading an image displayed by the image display device to an observer's eyeball without effecting image formation on the way to the observer's eyeball. The image display device and the optical system are retained on an observer's head or face by a retaining device. The apparatus is characterized in that the optical system includes a back-coated mirror and a plane-parallel plate having a semitransparent surface.

According to a second aspect of the present invention, there is provided a head- or face-mounted image display apparatus including an image display device and two, left and right, optical systems for leading an image displayed by the image display device to an observer's left and right eyes, respectively. The image display device and the two optical systems are retained on an observer's head or face by a retaining device. The apparatus is characterized by satisfying the following condition:

$$d < L < \infty \tag{7}$$

where L is a vergence distance (image fusing position) given by optical axes of the two optical systems, and d is a distance to a virtual image of the image display device formed by the optical systems.

It is desirable that the head- or face-mounted image display apparatus according to the second aspect of the present invention should satisfy the following condition:

$$1.5d < L < 4d \tag{8}$$

According to a third aspect of the present invention, there is provided a head- or face-mounted image display apparatus including an image display device and an optical system for leading an image displayed by the image display device to an observer's eyeball without effecting image formation on the way to the observer's eyeball. The image display device and the optical system are retained on an observer's head or face by a retaining device. The apparatus is characterized by providing a circularly polarizing plate between the optical system and the observer's eyeball.

According to a fourth aspect of the present invention, there is provided a head- or face-mounted image display apparatus including an image display device and an optical system for leading an image displayed by the image display device to an observer's eyeball without effecting image formation on the way to the observer's eyeball. The image display device and the optical system are retained on an observer's head or face by a retaining device. The apparatus is characterized by providing a light-reducing device between the optical system and the observer's eyeball.

The reasons for adopting the above-described arrangements in the present invention, together with the functions thereof, will be explained below.

The head- or face-mounted image display apparatus according to the first aspect of the present invention is characterized by including a back-coated mirror and a plane-parallel plate having a semitransparent surface.

More specifically, a concave mirror having a radius R of curvature and lying in a medium of refractive index n has a focal length of $-R/2n$. The use of a back-coated mirror enables the refractive index n to be larger than 1 and hence makes it possible to obtain a larger radius of curvature than that of a surface-coated reflecting mirror having the same focal length as that of the back-coated mirror. Because the reciprocal of curvature of field, that is, Petzval sum, is inversely proportional to the curvature of a reflecting surface, the use of a back-coated mirror enables the amount of field curvature to be reduced. Moreover, because the optical system is constructed by using a back-coated mirror and a plane-parallel plate having a semitransparent surface without using a prism, the position of the image display device can be brought close to the optical system. This enables the apparatus to be reduced in overall size and weight.

In this case, it is preferable that the radii of curvature of the reflecting and transmitting surfaces of the back-coated mirror should satisfy the following condition:

$$R/r<1 \quad (1)$$

where R is the radius of curvature of the reflecting surface of the back-coated mirror, and r is the radius of curvature of the transmitting surface of the back-coated mirror at the obverse side thereof, and where curvature in a direction away from the observer's eyeball is defined as being positive.

That is, when a surface-coated mirror is used as an optical system to obtain a focal length f, it is necessary to use a surface-coated mirror having a radius $R_s$ of curvature that satisfies the following condition:

$$1/f=-2/R_s$$

To attain the focal length f by using a back-coated mirror having a transmitting surface with a radius r of curvature, a reflecting surface with a radius $R_r$ of curvature, and a vitreous material having a refractive index n, the following condition should be satisfied:

$$1/f=2(n-1)/r-2n/R_r$$

where the wall thickness of the back-coated mirror is assumed to be ignorable.

Therefore, the following condition is derived from the above two conditions:

$$-1/R_s=(n-1)/r-n/R_r$$

In the case of a back-coated mirror, the greater part of curvature of field thereof is produced by its reflecting surface. The Petzval sum is inversely proportional to the curvature of the reflecting surface. Accordingly, it is possible to attain a smaller amount of field curvature than in the case of a surface-coated mirror by using a back-coated mirror if the following condition is satisfied:

$$R_r/R_s>1$$

Therefore, curvature of field can be reduced by using a back-coated mirror that satisfies the following conditions:

$$-\{(n-1)/r-n/R_r\}R_r>1$$

$$-(n-1)R_r/r+n>1$$

$$R_r/r<1$$

It is preferable that the radii of curvature of the reflecting and transmitting surfaces of the back-coated mirror should satisfy the following condition:

$$-2.0<R/r<0.5 \quad (2)$$

That is, if $R/r<0.5$, the amount of field curvature further reduces. If $R/r \leq -2.0$, the curvature of the transmitting surface of the back-coated mirror becomes large, causing an increase of astigmatism produced by refraction at the transmitting surface. By satisfying the condition of $-2.0<R/r<0.5$, the curvature of field can be favorably reduced without increasing the astigmatism.

It is preferable that the radii of curvature of the reflecting and transmitting surfaces of the back-coated mirror should satisfy the following condition:

$$-0.35<R/r<0 \quad (3)$$

By satisfying the condition (3), the amount of field curvature and astigmatism further reduce, and visibility further improves.

Alternatively, it is preferable that the radii of curvature of the reflecting and transmitting surfaces of the back-coated mirror should satisfy the following condition:

$$0<R/r<0.5 \quad (4)$$

It may be more important to correct astigmatism than to reduce the amount of field curvature depending upon the conditions of use and application. In such a case, the condition of $0<R/r<0.5$ should be satisfied. By doing so, astigmatism can be minimized. Thus, it is possible to provide an apparatus having remarkably excellent visibility.

It is also preferable that the transmitting surface of the back-coated mirror should be a plane surface. If the transmitting surface is a plane surface, the surface machining accuracy improves. Moreover, the machining process is facilitated. Therefore, the production cost can be reduced.

It is preferable to provide an optical element having a positive refracting power between the plane-parallel plate and the observer's eyeball. Disposing such an optical element makes it possible to reduce the ray height at the plane-parallel plate and the back-coated mirror. Accordingly, it is possible to reduce the size of a half-mirror and concave mirror used.

It is preferable that the refracting power $\phi$ of the optical element having a positive refracting power should satisfy the following condition:

$$0.3<\phi/\phi_t<0.45 \quad (9)$$

where $\phi_t$ is the refracting power of the entire optical system.

That is, if $\phi/\phi_t$ is not larger than 0.3, the ray height reducing effect weakens. If $\phi/\phi_t$ is not smaller than 0.45, spherical and comatic aberrations produced by the optical element having a positive refracting power increase unfavorably.

It is preferable that the optical element having a positive refracting power should be a plano-convex lens having a plane surface directed toward the observer's eyeball. If the optical element has a plane surface at one side thereof, the surface machining accuracy improves. Moreover, the machining process is facilitated. Therefore, the production cost can be reduced. Because the plano-convex lens can be used as a cover glass, there is no need to provide separately providing a cover glass. This enables the cost to be further reduced.

It is preferable for the optical system to include an optical element having a negative refracting power between the plane-parallel plate and the image display device. If such an optical element is disposed, the exit angle of light rays emanating from the image display device can be made closer to being perpendicular. Therefore, even when the apparatus uses an image display device whose characteristics change according to the angle of light rays emanating therefrom, e.g. a liquid crystal display device, it is possible to provide an image which is favorable from the center to the periphery thereof.

It is preferable that the refracting power $\phi$ of the optical element having a negative refracting power should satisfy the following condition:

$$-1 < \phi/\phi_r < -0.2 \qquad (5)$$

If $\phi/\phi_r$ is not smaller than $-0.2$, the effect whereby the inclination of light rays is made perpendicular weakens. If $\phi/\phi_r$ is not larger than $-1$, it becomes necessary to increase the curvature of the reflecting surface of the back-coated mirror. Consequently, the amount of field curvature increases unfavorably. If the condition of $-1 < \phi/\phi_r < -0.2$ is satisfied, the inclination of light rays can be made close to being perpendicular without increasing the amount of field curvature. Thus, an image of favorable visibility can be provided.

It is preferable that the reflecting surface of the back-coated mirror should be an aspherical surface. If the reflecting surface of the back-coated mirror has such an aspherical surface configuration that light rays incident on the periphery of the reflecting surface are subjected to weaker power than the power acting on light rays incident on the center of the reflecting surface, the amount of field curvature can be reduced.

It is preferable for the reflecting surface of the back-coated mirror to have a surface configuration in which the radius of curvature becomes relatively larger as the distance from the center of symmetry of the surface configuration increases toward the periphery thereof. If the radius of curvature is made larger as the distance from the center of symmetry increases toward the periphery, the power at the periphery is weakened. Thus, it is possible to reduce negative curvature of field produced at the reflecting surface of the back-coated mirror. The term "negative curvature of field" as used herein means curvature of field in which a virtual image projected by the optical system is curved such that the periphery of the image is closer to the observer than the center of the image.

It is preferable that the transmitting surface of the back-coated mirror should be an aspherical surface. If the transmitting surface of the back-coated mirror has such an aspherical surface configuration that light rays incident on the periphery of the transmitting surface are subjected to weaker refracting power than the power acting on light rays incident on the center of the transmitting surface, the amount of field curvature can be reduced.

It is preferable for the transmitting surface of the back-coated mirror to have a surface configuration in which a positive refracting power becomes weaker or a negative refracting power becomes stronger as the distance from the center of symmetry of the surface configuration increases toward the periphery thereof. With such a surface configuration, it is possible to reduce negative curvature of field produced at the reflecting surface of the concave mirror.

It is preferable that the back-coated mirror should be formed by providing a cemented lens with a reflective coating. With such an arrangement, chromatic aberrations produced by the back-coated mirror can be corrected by the cemented lens to improve visibility.

It is preferable for the cemented lens to comprise a meniscus lens having a convex surface directed toward the observer's eyeball, and a biconvex lens having a reflective coating provided on one side thereof. Such an arrangement makes it possible to correct chromatic aberrations even more effectively.

It is preferable that the cemented lens should be formed from two different kinds of vitreous material which satisfy the following condition:

$$v_1 < v_2 \qquad (6)$$

where $v_1$ is the Abbe's number of the vitreous material of the lens element closer to the image display device, and $v_2$ is the Abbe's number of the vitreous material of the lens element closer to the reflecting surface.

If the condition (6) is satisfied, chromatic aberrations can be corrected even more effectively.

It is preferable for the above-described optical system to have a cover glass between the plane-parallel plate and the observer's eyeball. Such an arrangement makes it possible to prevent dust or other foreign matter from entering the optical system.

It is preferable to provide an antireflective coating on the cover glass. When a cover glass is provided, as shown in FIG. 10, external light rays may be reflected at the surface of a cover glass 11 to enter an observer's pupil 5, having an adverse effect on the visibility of an image for observation. Particularly, when the apparatus is arranged so as to enable the outside world to be seen, as described later, the periphery of the observer's eye 5 or the observer's face may be illuminated brightly with the external light. In such a case, there is a strong likelihood that the illuminated part of the face will be undesirably reflected on the cover glass 11. The effect of the external light can be reduced by providing an antireflective coating on the cover glass 11.

It is preferable for the cover glass 11 to be tilted with respect to an optical axis extending from the observer's pupil toward the center of the virtual image of the image display device (hereinafter referred to as simply "optical axis"). If the cover glass 11 is tilted with respect to the optical axis, as shown in FIG. 11, external light from the periphery of the observer's eye 5 or the observer's face is prevented from entering the observer's eye 5 even if the light is reflected at the cover glass 11.

It is preferable that the back-coated mirror should be provided to face opposite to the observer's eyeball. That is, the user may observe the outside world with the head- or face-mounted image display apparatus fitted on his/her head or face depending upon the application of use. In particular, to perform some operation, the user needs to see where his/her hands are working. Therefore, it is important to ensure a visual field below the image display apparatus. Accordingly, it is conceivable to provide an open space below the image display apparatus in order to ensure a lower visual field. If a concave mirror is provided at the lower side of the apparatus as in Japanese Patent Application Unexamined Publication (KOKAI) No. 3-191389, the field angle at which the outside world can be observed is reduced by the presence of the concave mirror. More specifically, if, as shown in FIG. 12, a concave mirror 3 is provided at the lower side of the apparatus, the angle $\theta_2$ of a lower visual field for observation of the outside world is reduced because of the space occupied by the concave mirror 3. On the other hand, if the concave mirror 3 is provided to face the observer's pupil 5, as shown in FIG. 13, the angle $\theta_1$ at which the outside world can be observed is much larger than the angle $\theta_2$. Thus, by providing the back-coated mirror 3 opposite the observer's pupil 5, a sufficiently wide field angle for observation of the outside can be ensured below the apparatus.

It is also conceivable to provide the concave mirror 3 at the upper side of the apparatus in inverse relation to the arrangement shown in FIG. 12. In this case also, the field angle at which the outside world can be observed is limited because the image display device 1 is provided at the lower side of the apparatus in place of the concave mirror 3.

It is preferable to provide the image display device on a side of the optical axis. As shown in the plan view of FIG. 14 or 15, if the image display device 1 is provided on a side of the optical axis, there is nothing obstructing the lower visual field. Therefore, a sufficiently wide field angle for observation of the outside can be ensured below the apparatus.

The head- or face-mounted image display apparatus according to the second aspect of the present invention includes an image display device and two optical systems for leading an image displayed by the image display device to observer's left and right eyeballs, respectively. The image display device and the two optical systems are retained on an observer's head or face by a retaining device. The apparatus is characterized by satisfying the following condition:

$$d<L<\infty \tag{7}$$

where L is a vergence distance (image fusing position) given by optical axes of the two optical systems, and d is a distance to a virtual image of the image display device formed by the optical systems.

When a virtual image of an image displayed by an image display device is formed at a finite distance, if two left and right optical systems are disposed such that their optical axes are parallel to each other, as disclosed in U.S. Pat. Nos. 4,805,988 and 4,853,764, the left and right optical axes may shift outward when there is no mechanism for adjusting the interpupillary distance (i.e. the distance between the two eyes), or when the interpupillary distance has not accurately been adjusted.

More specifically, in the plan view of FIG. 16, if the left and right optical axes are set parallel to each other so that the vergence angle is 0 (i.e. the image fusing position is at infinity) when the interpupillary distance is equal to the standard as shown by reference character A, the vergence angle θ becomes divergent when the interpupillary distance is shorter than the standard as shown by reference character B. If the left and right optical axes shift outward, it becomes extremely difficult to fuse two images into a single image. To solve this problem, it is conceivable to make the diopter and the vergence angle match each other, as disclosed in U.S. Pat. No. 5,034,809. However, if the vergence angle is increased, the observer is forced to observe at an unfavorably large vergence angle. Therefore, it may be necessary to take care not to make the observer feel uncomfortable or fatigued.

Therefore, in the present invention, the apparatus is arranged such that, as shown in FIG. 17, the vergence distance L given by the optical axes of the two optical systems and the distance d to a virtual image of the image display device formed by the optical systems satisfy the condition of $d<L<\infty$. It will be understood that, with the illustrated arrangement, the vergence angle is not very large, and it is possible to prevent the optical axes from shifting outward even when the interpupillary distance is shorter than the standard as shown by reference character B.

In the head- or face-mounted image display apparatus according to the second aspect of the present invention, the distance to the virtual image of the image display device formed by the optical systems satisfies the following condition:

$$1.5d<L<4d \tag{8}$$

By satisfying the condition (8), it becomes possible to further reduce the vergence angle and to enhance the effect of preventing the optical axes from shifting outward.

In the head- or face-mounted image display apparatuses according to the second and third aspects of the present invention, it is preferable to shift the image display device sideways such that the center of a virtual image of the image display device formed by each of the left and right optical systems shifts horizontally inward relative to the forward direction of the observer. With this arrangement, it is possible to make the optical axes shift inward when observing the virtual image of the image display device.

It is preferable that the left and right optical systems and image display devices should be tilted inward. In a case where the left and right image display devices are shifted from the center axes of the optical systems, the image display devices need to be shifted horizontally inward in order to shift the optical axes inward. Therefore, it has heretofore been necessary to take care to prevent interference between the left and right image display devices. If the left and right optical systems and image display devices are tilted inward, it is possible to make the optical axes shift inward when observing the virtual images of the image display devices.

It is preferable to shift the optical axes inward by shifting an image displayed on each image display device horizontally inward such that the center of the image displayed on the image display device is not coincident with the center of the image display device. That is, shifting the image display device or tilting the entire optical system requires a space therefor, causing the apparatus to increase in size. Shifting of the center of the image displayed on the image display device can be effected by an electrical operation. Therefore, a space for providing a vergence angle becomes unnecessary.

The head- or face-mounted image display apparatus according to the third aspect of the present invention is characterized by providing a circularly polarizing plate between an optical system and an observer's eyeball. In the case of an optical system such as that shown in FIG. 18, light rays externally entering the optical system may be reflected at a concave mirror 3 to enter an observer's pupil 5. In this case, the external light is superimposed on an image to be observed, giving an adverse effect on the visibility of the image. Therefore, the optical system is arranged such that, as shown in FIG. 19, external light enters the optical system through a circularly polarizing plate 12 and is reflected by the concave mirror 3. When reflected by the concave mirror 3, the external light becomes circularly polarized light opposite in polarization direction to the external light as it enters the optical system. Accordingly, the transmittance of the external light through the circularly polarizing plate 12 becomes small. Thus, the external light is prevented from reaching the observer's pupil 5.

The head- or face-mounted image display apparatus according to the fourth aspect of the present invention is characterized by providing a light-reducing device, e.g. an ND (Neutral Density) filter, between an optical system and an observer's eyeball. The arrangement will be explained with reference to FIG. 19. External light enters the optical system through a light-reducing device 13 and is reflected by the concave mirror 3. The light reflected from the concave mirror 3 passes through the light-reducing device 13 again before entering the observer's pupil 5. On the other hand, image light from the image display device 1 passes through the light-reducing device 13 only once to enter the observer's pupil 5. Accordingly, the brightness ratio of the image as observed to the external light is higher than in an arrangement where the light-reducing device 13 is not provided. Thus, the effect of the external light on the image is minimized.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 6 is a sectional view of an optical system according to Example 10.

FIG. 7 is a sectional view of an optical system according to Example 11.

FIG. 8 is a sectional view of an optical system according to Example 14.

DESCRIPTION OF THE PREFERRED EMBODIMENTS

Examples 1 to 17 of the optical system of the head-mounted image display apparatus according to the present invention will be described below with reference to FIGS. 1 to 9.

Constituent parameters of Examples 1 to 17 will be shown later. In the following description, surface numbers are shown as ordinal numbers in backward tracing from an observer's pupil position 5 toward an image display device 1. The rotationally symmetric aspherical configuration of each surface may be expressed by $$Z=[(h^2/R)/[1+\{1-(h^2/R^2)\}^{1/2}]+Ah^4$$

where: R is a paraxial curvature radius; A is a 4th-order aspherical coefficient; and h is given by $h^2=X^2+Y^2$.

It should be noted that an optical axis is a Z-axis, where a direction away from the pupil 5 is a positive direction. A direction parallel to the plane of each of FIGS. 1 to 9 and perpendicular to the Z-axis is taken as a Y-axis, where the upward direction as viewed in these figures is defined as a positive direction.

In the constituent parameters (shown later), the refractive index of a medium between adjacent surfaces is expressed by the refractive index for the spectral d-line. Lengths are given in millimeters. For the tilt angle, the counterclockwise direction is defined as a positive direction.

Surface separations are defined along an axial principal ray in backward ray tracing. The sign of the surface separation changes every time reflection takes place.

EXAMPLE 1

Figure 1:
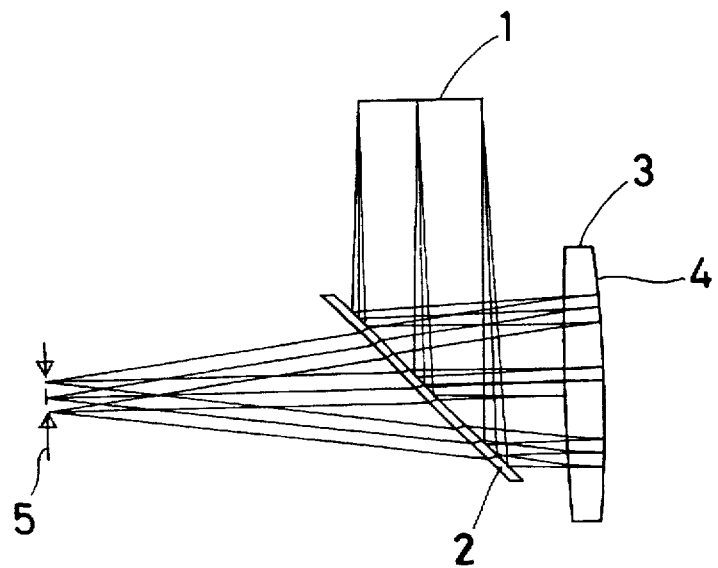
FIG. 1 is a sectional view of an optical system according to Example 1 of the head-mounted image display apparatus according to the present invention.

FIG. 1 is a sectional view of an optical system according to this example. The actual path of light rays is as follows: Light rays from an image display device 1 are reflected by a half-mirror 2 and then reflected by a reflecting surface 4 of a back-coated mirror 3. Thereafter, the light rays pass through the half-mirror 2 and enter an observer's pupil 5. The back-coated mirror 3 has the reflecting surface 4 provided on the reverse side of a biconvex lens.

The size of the image display device 1 is 16.8 mm×22.4 mm (equivalent to a diagonal of 1.1 inches). The horizontal field angle is 20°. R/r is given by $$R/r=-0.61$$

In this example, most of the propagation optical path lies in the air. Therefore, the image display device 1 can be successfully brought close to the optical system in comparison to an optical system using a prism. Accordingly, it is possible to realize a compact head- or face-mounted image display apparatus. The use of the back-coated mirror 3, wherein R/r=−0.61, makes it possible to reduce curvature of field without increasing astigmatism. Thus, an optical system favorably corrected for aberrations is provided.

Although in the following examples the half-mirror 2 is designed with a thickness of zero, it should be noted that a half-mirror having a finite thickness may be used in the following examples because the optical effect given by the thickness of the half-mirror 2 is extremely small. The use of a half-mirror having a finite thickness has no effect on the operation of the optical system and effects achieved thereby.

EXAMPLE 2

Figure 2:
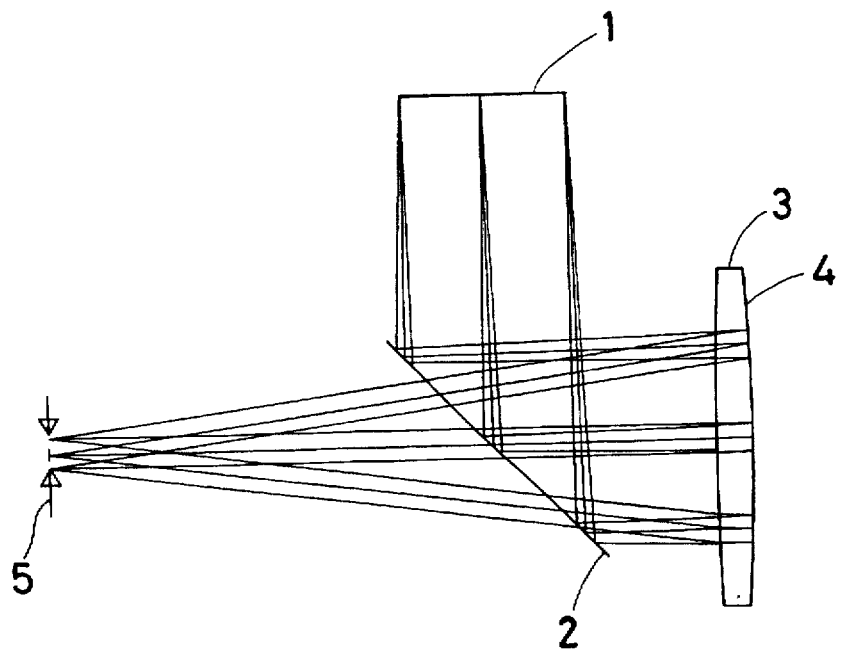
FIG. 2 is a sectional view of an optical system according to Example 2.

FIG. 2 is a sectional view of an optical system according to this example. The actual path of light rays is as follows: Light rays from an image display device 1 are reflected by a half-mirror 2 and then reflected by a reflecting surface 4 of a back-coated mirror 3. Thereafter, the light rays pass through the half-mirror 2 and enter an observer's pupil 5. The back-coated mirror 3 has the reflecting surface 4 provided on the reverse side of a biconvex lens.

The size of the image display device 1 is 22.9 mm×30.5 mm (equivalent to a diagonal of 1.5 inches). The horizontal field angle is 20°. R/r is given by R/r=−0.85

EXAMPLE 3

The optical system according to this example has the same arrangement as that of Example 2; therefore, illustration thereof is omitted. The size of the image display device 1 is 22.9 mm×30.5 mm (equivalent to a diagonal of 1.5 inches). The horizontal field angle is 30°. R/r is given by R/r=−0.5

EXAMPLE 4

The optical system according to this example has the same arrangement as that of Example 2; therefore, illustration thereof is omitted. The size of the image display device 1 is 30.5 mm×40.6 mm (equivalent to a diagonal of 2.0 inches). The horizontal field angle is 30°. R/r is given by R/r=−0.54

EXAMPLE 5

The optical system according to this example has the same arrangement as that of Example 2; therefore, illustration thereof is omitted. The size of the image display device 1 is 30.5 mm×40.6 mm (equivalent to a diagonal of 2.0 inches). The horizontal field angle is 40°. R/r is given by R/r=−0.16

In this example, a back-coated mirror 3 wherein R/r=−0.16 is used to thereby provide an optical system having minimal field curvature and minimal astigmatism and exhibiting favorable visibility.

EXAMPLE 6

The optical system according to this example has the same arrangement as that of Example 2; therefore, illustration thereof is omitted. The size of the image display device 1 is 16.8 mm×22.4 mm (equivalent to a diagonal of 1.1 inches). The horizontal field angle is 30°. R/r is given by R/r=−0.12

EXAMPLE 7

Figure 3:
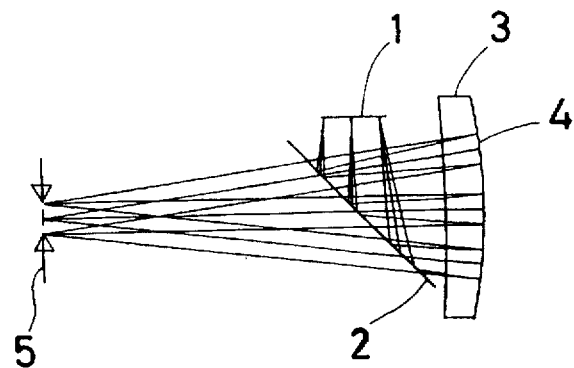
FIG. 3 is a sectional view of an optical system according to Example 7.

FIG. 3 is a sectional view of an optical system according to this example. The actual path of light rays is as follows: Light rays from an image display device 1 are reflected by a half-mirror 2 and then reflected by a reflecting surface 4 of a back-coated mirror 3. Thereafter, the light rays pass through the half-mirror 2 and enter an observer's pupil 5. The back-coated mirror 3 has the reflecting surface 4 provided on the reverse side of a positive meniscus lens which is concave toward the pupil 5.

The size of the image display device 1 is 7.6 mm×10.2 mm (equivalent to a diagonal of 0.5 inch). The horizontal field angle is 20°. R/r is given by R/r=0.42

The use of the back-coated mirror 3, wherein R/r=0.42, enables astigmatism to be corrected extremely favorably.

EXAMPLE 8

Figure 4:
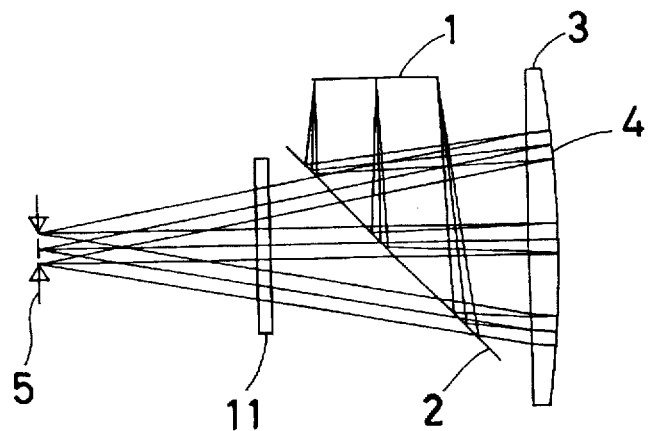
FIG. 4 is a sectional view of an optical system according to Example 8.

FIG. 4 is a sectional view of an optical system according to this example. The actual path of light rays is as follows:

Light rays from an image display device 1 are reflected by a half-mirror 2 and then reflected by a reflecting surface 4 of a back-coated mirror 3. Thereafter, the light rays pass through the half-mirror 2 and enter an observer's pupil 5 through a cover glass 11. The back-coated mirror 3 has the reflecting surface 4 provided on the reverse side of a plano-convex lens.

The size of the image display device 1 is 16.8 mm×22.4 mm (equivalent to a diagonal of 1.1 inches). The horizontal field angle is 27°. In this example, a plano-convex lens is used as the back-coated mirror 3, thereby enabling both an improvement in the machining accuracy and a reduction in the production cost.

EXAMPLE 9

Figure 5:
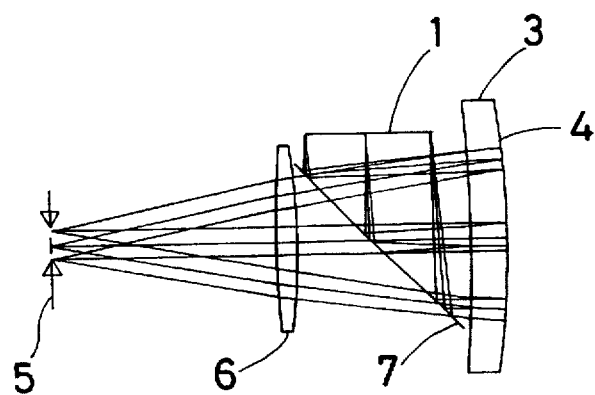
FIG. 5 is a sectional view of an optical system according to Example 9.

FIG. 5 is a sectional view of an optical system according to this example. The actual path of light rays is as follows: Light rays from an image display device 1 are reflected by a half-mirror 2 and then reflected by a reflecting surface 4 of a back-coated mirror 3. Thereafter, the light rays pass through the half-mirror 2 and enter an observer's pupil 5 through a single lens 6 of positive refracting power, which is a biconvex lens. The back-coated mirror 3 has the reflecting surface 4 provided on the reverse side of a positive meniscus lens which is concave toward the pupil 5.

The size of the image display device 1 is 16.8 mm×22.4 mm (equivalent to a diagonal of 1.1 inches). The horizontal field angle is 30°. $\phi/\phi_t$ is given by $\phi/\phi_t=0.4$ In this example, the lens 6 having a positive refracting power is provided between the half-mirror 2 and the observer's eyeball 5 to reduce the ray height at the half-mirror 2 and the back-coated mirror 3, thereby reducing the size of the half-mirror 2 and the back-coated mirror 3. It should be noted that a reduction in size of the optical system is attained without increasing aberrations by setting the refracting power ratio $\phi/\phi_t$ equal to 0.4.

EXAMPLE 10

FIG. 6 is a sectional view of an optical system according to this example. The actual path of light rays is as follows: Light rays from an image display device 1 are reflected by a half-mirror 2 and then reflected by a reflecting surface 4 of a back-coated mirror 3. Thereafter, the light rays pass through the half-mirror 2 and enter an observer's pupil 5 through a single lens 6 of positive refracting power, which is a plano-convex lens having a plane surface directed toward the pupil 5. The back-coated mirror 3 has the reflecting surface 4 provided on the reverse side of a positive meniscus lens which is concave toward the pupil 5.

The size of the image display device 1 is 16.8 mm×22.4 mm (equivalent to a diagonal of 1.1 inches). The horizontal field angle is 30°. $\phi/\phi_t$ is given by $\phi/\phi_t=0.24$ In this example, the lens 6 having a positive refracting power is a plano-convex lens having a plane surface directed toward the observer's pupil 5, thereby enabling both an improvement in the machining accuracy and a reduction in the production cost. Moreover, because the plano-convex lens 6 can be used as a cover glass, the cost can be further reduced.

EXAMPLE 11

FIG. 7 is a sectional view of an optical system according to this example. The actual path of light rays is as follows:

Light rays from an image display device 1 pass through a concavo-plane lens 7 as an optical element having a negative refracting power. The light rays are reflected by a half-mirror 2 and then reflected by a reflecting surface 4 of a back-coated mirror 3. Thereafter, the light rays pass through the half-mirror 2 and enter an observer's pupil 5. The back-coated mirror 3 has the reflecting surface 4 provided on the reverse side of a biconvex lens.

The size of the image display device 1 is 16.8 mm×22.4 mm (equivalent to a diagonal of 1.1 inches). The horizontal field angle is 30°. $\phi/\phi_t$ is given by $$\phi/\phi_t = -0.32$$

In this example, the lens 7 having a negative refracting power is provided between the half-mirror 2 and the image display device 1. This enables the inclination of light rays emanating from the image display device 1 to approach the perpendicular. Moreover, by setting $\phi/\phi_t$ equal to −0.32, the inclination of light rays emanating from the image display device 1 are brought close to being perpendicular without increasing curvature of field.

EXAMPLE 12

The optical system according to this example has the same arrangement as that of Example 2; therefore, illustration thereof is omitted. The size of the image display device 1 is 16.8 mm×22.4 mm (equivalent to a diagonal of 1.1 inches). The horizontal field angle is 30°. The reflecting surface 4 of the back-coated mirror 3 in this example has such an aspherical surface configuration that the radius of curvature becomes relatively larger as the distance from the center of the surface configuration increases toward the periphery thereof with such an aspherical surface configuration, the refracting power at the periphery of the concave mirror 4 is weakened to correct curvature of field.

EXAMPLE 13

The optical system according to this example has the same arrangement as that of Example 2; therefore, illustration thereof is omitted. The size of the image display device 1 is 16.8 mm×22.4 mm (equivalent to a diagonal of 1.1 inches). The horizontal field angle is 30°. The transmitting surface 8 of the back-coated mirror 3 in this example has such a configuration that a positive refracting power becomes weaker as the distance from the center of the surface configuration increases toward the periphery thereof, thereby correcting curvature of field.

EXAMPLE 14

FIG. 8 is a sectional view of an optical system according to this example. The actual path of light rays is as follows: Light rays from an image display device 1 are reflected by a half-mirror 2 and then reflected by a reflecting surface 4 of a back-coated mirror 3. Thereafter, the light rays pass through the half-mirror 2 and enter an observer's pupil 5. The back-coated mirror 3 is formed by using a cemented lens comprising a negative meniscus lens 9 having a convex surface directed toward the eyeball 5, and a biconvex lens 10 having a reflective coating provided on one side thereof.

The size of the image display device 1 is 7.6 mm×10.2 mm (equivalent to a diagonal of 0.5 inch). The horizontal field angle is 20°.

In this example, chromatic aberrations are corrected by using a cemented lens comprising a negative meniscus lens 9 having a convex surface directed toward the eyeball 5, and a biconvex lens 10 having a reflective coating provided on one side thereof. It should be noted that the Abbe's number $v_1$ of the vitreous material of the meniscus lens 9 and the Abbe's number $v_2$ of the vitreous material of the biconvex lens 10 satisfy the following condition:

$$v_1 < v_2$$

EXAMPLE 15

The optical system according to this example has the same arrangement as that of Example 14; therefore, illustration thereof is omitted. The size of the image display device 1 is 16.8 mm×22.4 mm (equivalent to a diagonal of 1.1 inches). The horizontal field angle is 20°.

EXAMPLE 16

The optical system according to this example has the same arrangement as that of Example 14; therefore, illustration thereof is omitted. The size of the image display device 1 is 16.8 mm×22.4 mm (equivalent to a diagonal of 1.1 inches). The horizontal field angle is 30°.

EXAMPLE 17

Figure 9:
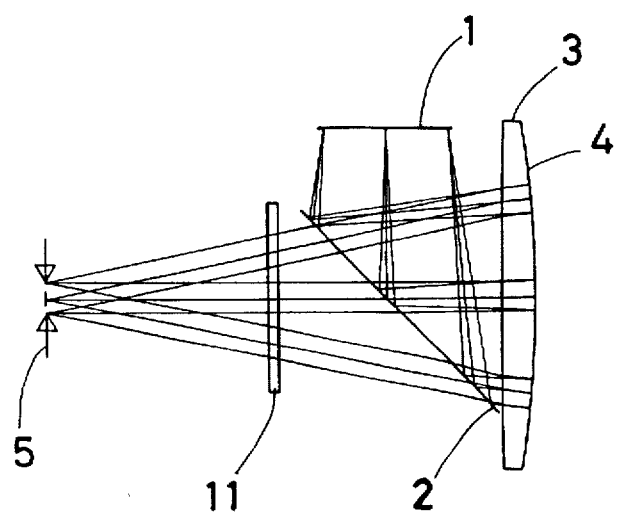
FIG. 9 is a sectional view of an optical system according to Example 17.
Figure 10:
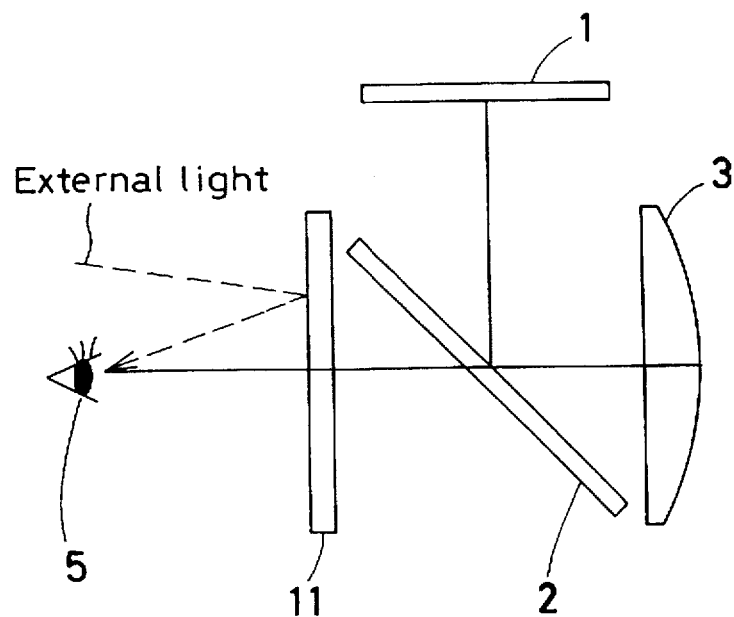
FIG. 10 is a view for explaining of the effect of external light when a cover glass is provided.
Figure 11:
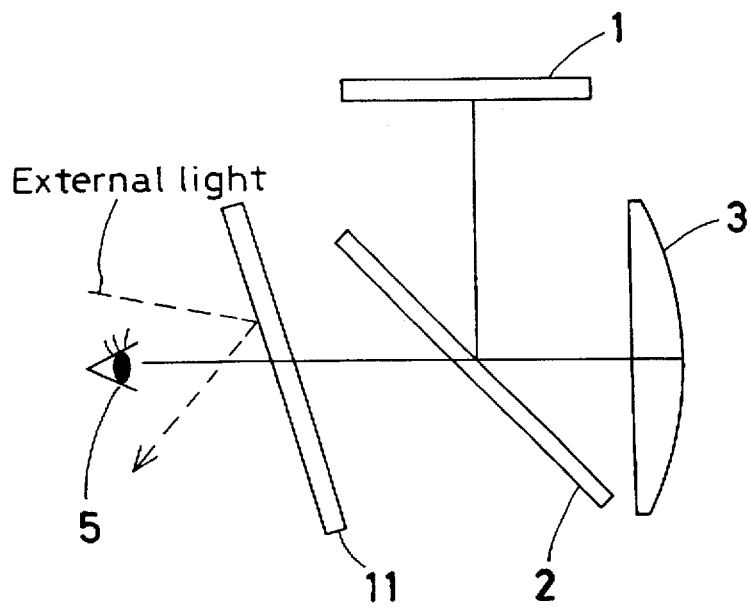
FIG. 11 shows an arrangement for preventing the effect of external light when a cover glass is provided.
Figure 12:
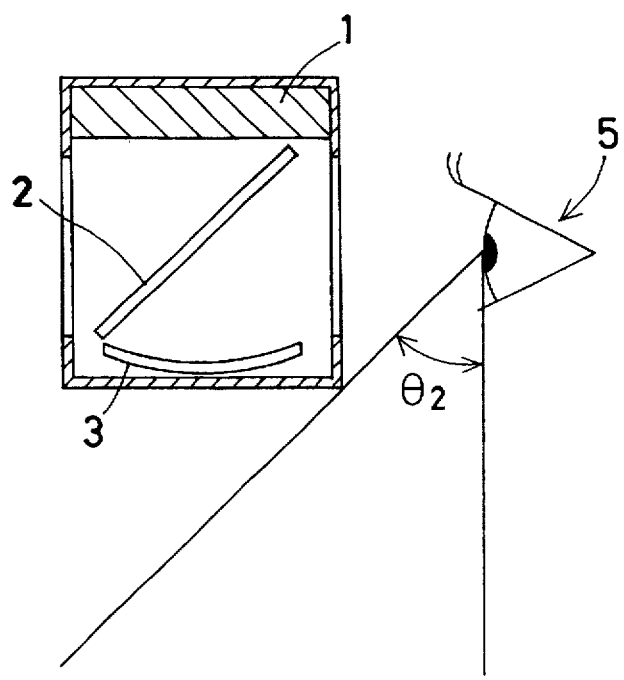
FIG. 12 illustrates the way in which a field angle for observation of the outside world becomes small if a concave mirror is provided at a lower side of an apparatus.
Figure 13:
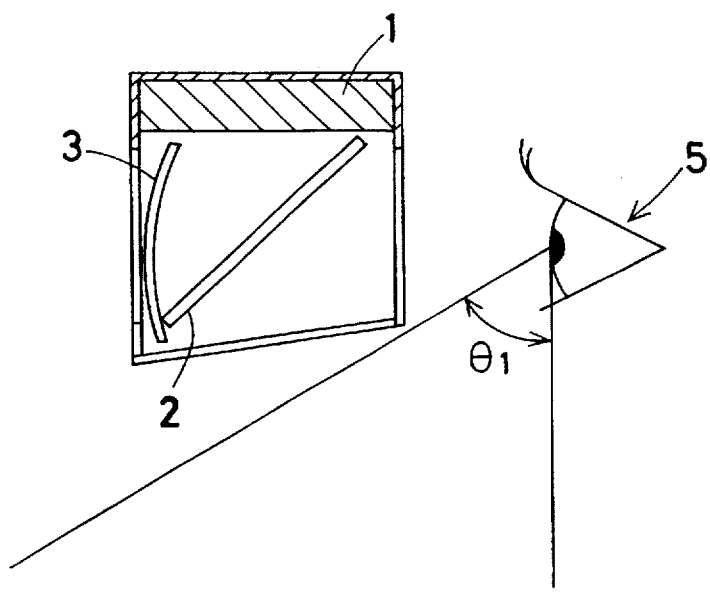
FIG. 13 shows a concave mirror providing a position which enables a field angle for observation of the outside world to increase.
Figure 14:
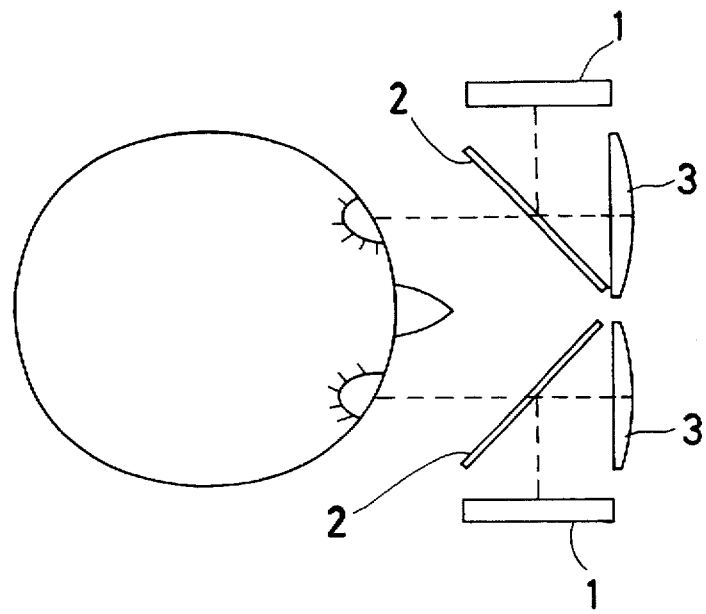
FIG. 14 is a plan view showing one example of an arrangement in which image display devices are each provided at a side of an optical axis.
Figure 15:
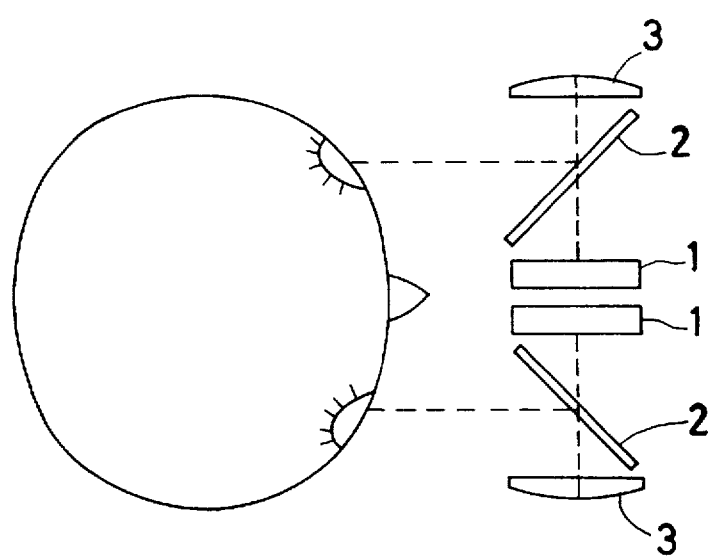
FIG. 15 is a plan view showing another example of an arrangement in which image display devices are each provided at a side of an optical axis.
Figure 16:
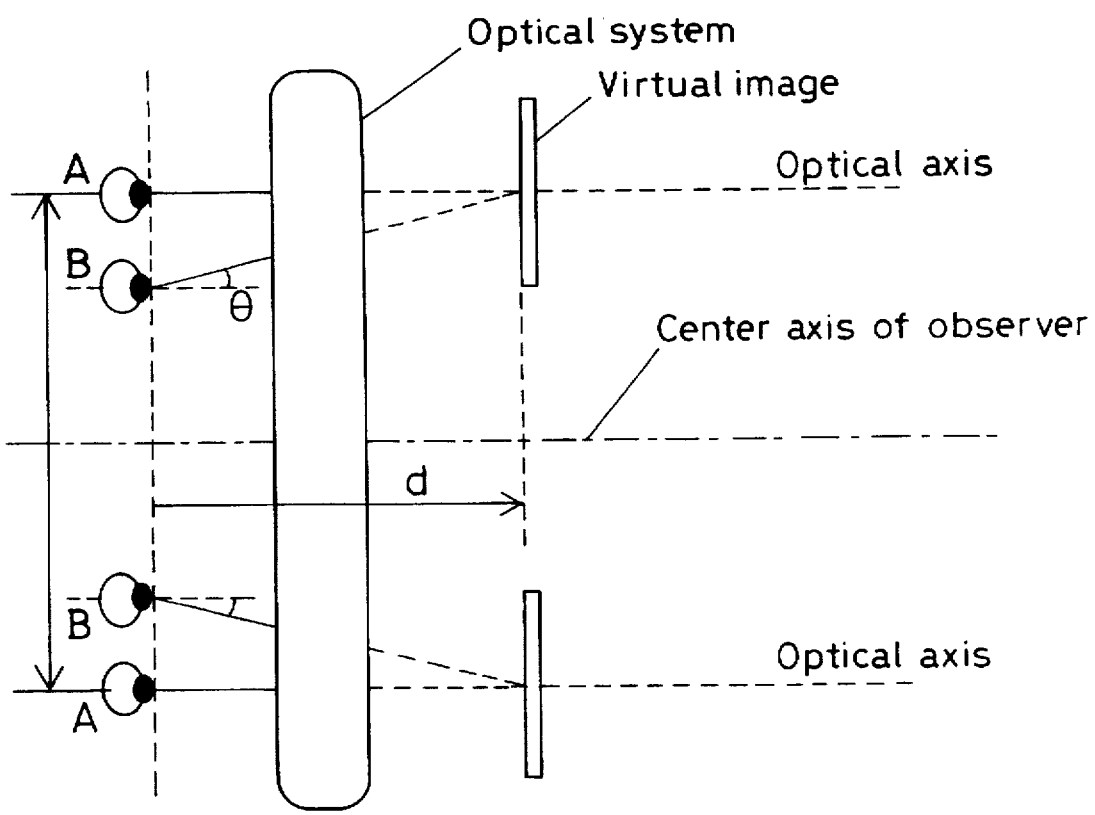
FIG. 16 is a plan view showing that a vergence angle may become divergent when left and right optical axes are parallel to each other.
Figure 17:
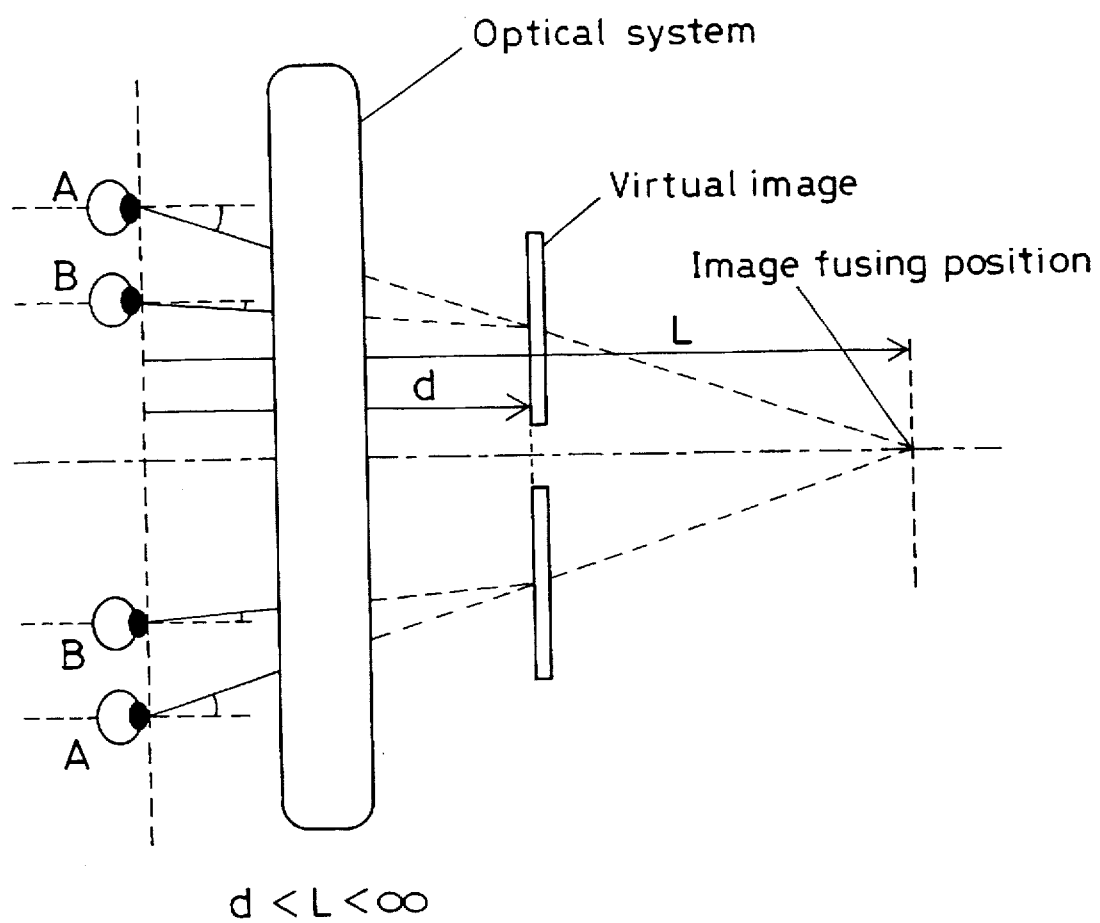
FIG. 17 is a plan view showing an arrangement in which left and right optical axes intersect each other at a finite distance according to the present invention.
Figure 18:
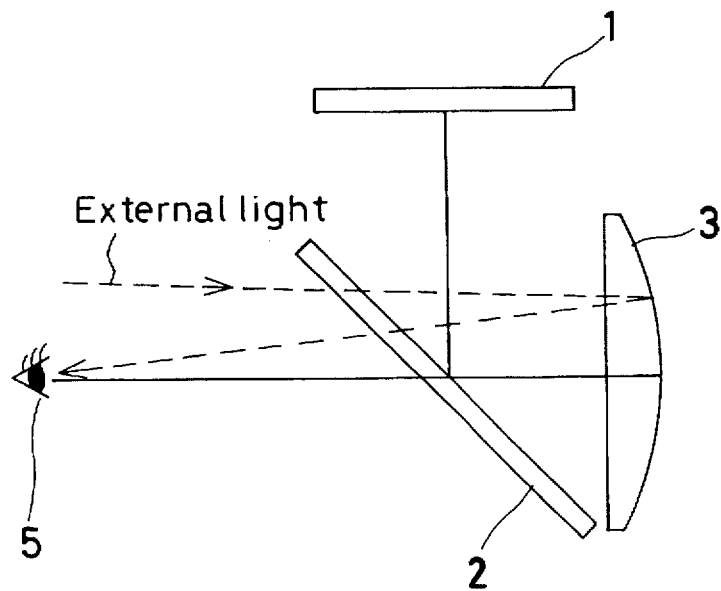
FIG. 18 is a view for explaining of the effect of external light when a concave mirror is provided to face opposite to an observer's pupil.
Figure 19:
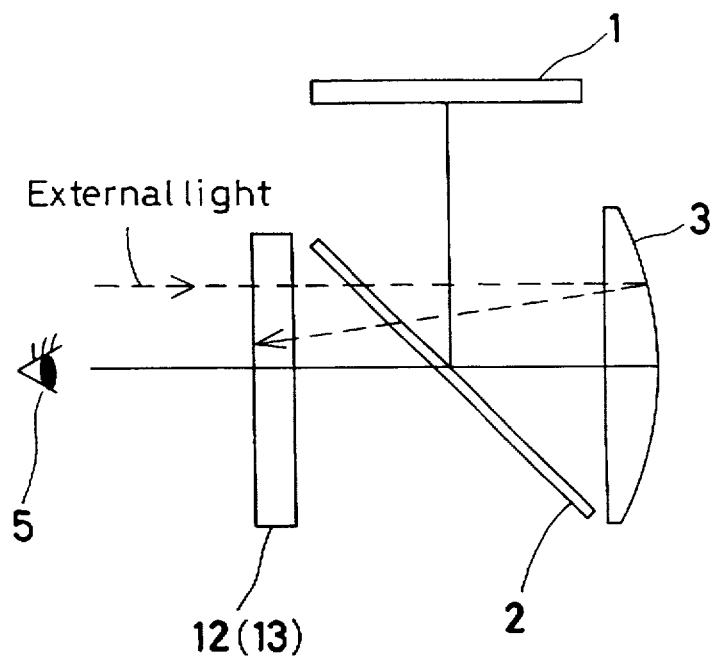
FIG. 19 shows an arrangement for preventing the effect of external light as shown in FIG. 18.

FIG. 9 is a sectional view of an optical system according to this example. The actual path of light rays is as follows: Light rays from an image display device 1 are reflected by a half-mirror 2 and then reflected by a reflecting surface 4 of a back-coated mirror 3. Thereafter, the light rays pass through the half-mirror 2 and enter an observer's pupil 5 through a cover glass 11. The back-coated mirror 3 has the reflecting surface 4 provided on the reverse side of a biconvex lens.

The size of the image display device 1 is 16.8 mm×22.4 mm (equivalent to a diagonal of 1.1 inches). The horizontal field angle is 30°. In this example, the cover glass 11 is provided between the half-mirror 2 and the observer's eyeball 5, thereby preventing dust or other foreign matter from entering the image display apparatus.

Constituent parameters of the above-described Examples 1 to 17 are as follows:

| Surface No. | Radius of curvature | Surface separation | Refractive index | Abbe's No. | Tilt angle |
|---|---|---|---|---|---|
| Example 1 | | | | | |
| 1 | ∞(pupil) | 50.000 | | | |
| 2 | ∞ | 1.414 | 1.51633 | 64.15 | 45.00° |
| 3 | ∞ | 18.586 | | | 45.00° |
| 4 | 378.543 | 5.000 | 1.51633 | 64.15 | |
| 5 | −232.354 (reflecting surface) | −5.000 | 1.51633 | 64.15 | |
| 6 | 378.543 | −18.586 | | | |
| 7 | ∞ (reflecting surface) | 37.877 | | | 45.00° |
| 8 | ∞(display device) | | | | |
| Example 2 | | | | | |
| 1 | ∞(pupil) | 60.000 | | | |
| 2 | ∞ | 30.000 | | | 45.00° |
| 3 | 397.768 | 5.000 | 1.51633 | 64.15 | |
| 4 | −338.831 (reflecting surface) | −5.000 | 1.51633 | 64.15 | |
| 5 | 397.768 | −30.000 | | | |
| 6 | ∞ (reflecting surface) | 46.295 | | | 45.00° |
| 7 | ∞(display device) | | | | |

-continued

Example 3

| Surface No. | Radius of curvature | Surface separation | Refractive index | Abbe's No. | Tilt angle |
|---|---|---|---|---|---|
| 1 | ∞(pupil) | 48.000 | | | |
| 2 | ∞ | 18.000 | | | 45.00° |
| 3 | 412.595 | 5.000 | 1.51633 | 64.15 | |
| 4 | −204.761 (reflecting surface) | −5.000 | 1.51633 | 64.15 | |
| 5 | 412.595 | −18.000 | | | |
| 6 | ∞ (reflecting surface) | 33.466 | | | 45.00° |
| 7 | ∞(display device) | | | | |

Example 4

| Surface No. | Radius of curvature | Surface separation | Refractive index | Abbe's No. | Tilt angle |
|---|---|---|---|---|---|
| 1 | ∞(pupil) | 60.000 | | | |
| 2 | ∞ | 30.000 | | | 45.00° |
| 3 | 508.673 | 5.000 | 1.51633 | 64.15 | |
| 4 | −275.674 (reflecting surface) | −5.000 | 1.51633 | 64.15 | |
| 5 | 508.673 | −30.000 | | | |
| 6 | ∞ (reflecting surface) | 37.848 | | | 45.00° |
| 7 | ∞(display device) | | | | |

Example 5

| Surface No. | Radius of curvature | Surface separation | Refractive index | Abbe's No. | Tilt angle |
|---|---|---|---|---|---|
| 1 | ∞(pupil) | 55.000 | | | |
| 2 | ∞ | 25.000 | | | 45.00° |
| 3 | 1147.325 | 5.000 | 1.51633 | 64.15 | |
| 4 | −183.245 (reflecting surface) | −5.000 | 1.51633 | 64.15 | |
| 5 | 1147.325 | −25.000 | | | |
| 6 | ∞ (reflecting surface) | 25.780 | | | 45.00° |
| 7 | ∞(display device) | | | | |

Example 6

| Surface No. | Radius of curvature | Surface separation | Refractive index | Abbe's No. | Tilt angle |
|---|---|---|---|---|---|
| 1 | ∞(pupil) | 45.000 | | | |
| 2 | ∞ | 15.000 | | | 45.00° |
| 3 | 1098.160 | 5.000 | 1.51633 | 64.15 | |
| 4 | −132.783 (reflecting surface) | −5.000 | 1.51633 | 64.15 | |
| 5 | 1098.160 | −15.000 | | | |
| 6 | ∞ (reflecting surface) | 22.061 | | | 45.00° |
| 7 | ∞(display device) | | | | |

Example 7

| Surface No. | Radius of curvature | Surface separation | Refractive index | Abbe's No. | Tilt angle |
|---|---|---|---|---|---|
| 1 | ∞(pupil) | 42.000 | | | |
| 2 | ∞ | 12.000 | | | 45.00° |
| 3 | −177.205 | 5.000 | 1.51633 | 64.15 | |
| 4 | −74.675 (reflecting surface) | −5.000 | 1.51633 | 64.15 | |
| 5 | −177.205 | −12.000 | | | |
| 6 | ∞ (reflecting surface) | 12.077 | | | 45.00° |
| 7 | ∞(display device) | | | | |

Example 8

| Surface No. | Radius of curvature | Surface separation | Refractive index | Abbe's No. | Tilt angle |
|---|---|---|---|---|---|
| 1 | ∞(pupil) | 30.000 | | | |
| 2 | ∞ | 1.500 | 1.49216 | 57.50 | |
| 3 | ∞ | 15.000 | | | |
| 4 | ∞ | 20.000 | | | 45.00° |
| 5 | ∞ | 4.000 | 1.51633 | 64.15 | |
| 6 | −140.039 (reflecting surface) | −4.000 | 1.51633 | 64.15 | |
| 7 | ∞ | −20.000 | | | |
| 8 | ∞ (reflecting surface) | 21.358 | | | 45.00° |
| 9 | ∞(display device) | | | | |

Example 9

| Surface No. | Radius of curvature | Surface separation | Refractive index | Abbe's No. | Tilt angle |
|---|---|---|---|---|---|
| 1 | ∞(pupil) | 30.000 | | | |
| 2 | 138.729 | 3.000 | 1.51633 | 64.15 | |
| 3 | −92.159 | 10.000 | | | |
| 4 | ∞ | 13.000 | | | 45.00° |
| 5 | −469.968 | 5.000 | 1.51633 | 64.15 | |
| 6 | −145.207 (reflecting surface) | −5.000 | 1.51633 | 64.15 | |
| 7 | −469.968 | −13.000 | | | |
| 8 | ∞ (reflecting surface) | 13.885 | | | 45.00° |
| 9 | ∞(display device) | | | | |

Example 12

| Surface No. | Radius of curvature | Surface separation | Refractive index | Abbe's No. | Tilt angle |
|---|---|---|---|---|---|
| 1 | ∞(pupil) | 45.000 | | | |
| 2 | ∞ | 15.000 | | | 45.00° |
| 3 | 1000.593 | 5.000 | 1.51633 | 64.15 | |
| 4 | −133.224  A: $3.2361 \times 10^{-9}$ (reflecting surface) | −5.000 | 1.51633 | 64.15 | |
| 5 | 1000.593 | −15.000 | | | |
| 6 | ∞ (reflecting surface) | 22.046 | | | 45.00° |
| 7 | ∞(display device) | | | | |

Example 13

| Surface No. | Radius of curvature | Surface separation | Refractive index | Abbe's No. | Tilt angle |
|---|---|---|---|---|---|
| 1 | ∞(pupil) | 45.000 | | | |
| 2 | ∞ | 15.000 | | | 45.00° |
| 3 | 479.835  A: $-5.6548 \times 10^{-8}$ | 5.000 | 1.51633 | 64.15 | |
| 4 | −139.710 (reflecting surface) | −5.000 | 1.51633 | 64.15 | |
| 5 | 479.835  A: $-5.6548 \times 10^{-8}$ | −15.000 | | | |
| 6 | ∞ (reflecting surface) | 22.070 | | | 45.00° |
| 7 | ∞(display device) | | | | |

Example 14

| Surface No. | Radius of curvature | Surface separation | Refractive index | Abbe's No. | Tilt angle |
|---|---|---|---|---|---|
| 1 | ∞(pupil) | 42.000 | | | |
| 2 | ∞ | 12.000 | | | 45.00° |
| 3 | 59.923 | 2.000 | 1.88300 | 40.78 | |
| 4 | 33.502 | 5.000 | 1.51633 | 64.15 | |
| 5 | −102.617 (reflecting surface) | −5.000 | 1.51633 | 64.15 | |
| 6 | 33.502 | −2.000 | 1.88300 | 40.78 | |
| 7 | 59.923 | −12.000 | | | |
| 8 | ∞ (reflecting surface) | 10.765 | | | 45.00° |
| 9 | ∞(display device) | | | | |

Example 15

| Surface No. | Radius of curvature | Surface separation | Refractive index | Abbe's No. | Tilt angle |
|---|---|---|---|---|---|
| 1 | ∞(pupil) | 50.000 | | | |
| 2 | ∞ | 20.000 | | | 45.00° |
| 3 | 307.218 | 3.000 | 1.88300 | 40.78 | |
| 4 | 175.651 | 5.000 | 1.51633 | 64.15 | |
| 5 | −211.573 (reflecting surface) | −5.000 | 1.51633 | 64.15 | |
| 6 | 175.651 | −3.000 | 1.88300 | 40.78 | |
| 7 | 307.218 | −20.000 | | | |
| 8 | ∞ (reflecting surface) | 34.622 | | | 45.00° |
| 9 | ∞(display device) | | | | |

Example 16

| Surface No. | Radius of curvature | Surface separation | Refractive index | Abbe's No. | Tilt angle |
|---|---|---|---|---|---|
| 1 | ∞(pupil) | 48.000 | | | |
| 2 | ∞ | 18.000 | | | 45.00° |
| 3 | 1262.226 | 3.000 | 1.62096 | 35.88 | |
| 4 | 180.864 | 5.000 | 1.51633 | 64.15 | |
| 5 | −125.249 (reflecting surface) | −5.000 | 1.51633 | 64.15 | |
| 6 | 180.864 | −3.000 | 1.62096 | 35.88 | |
| 7 | 1262.226 | −18.000 | | | |
| 8 | ∞ (reflecting surface) | 16.706 | | | 45.00° |
| 9 | ∞(display device) | | | | |

Example 17

| Surface No. | Radius of curvature | Surface separation | Refractive index | Abbe's No. | Tilt angle |
|---|---|---|---|---|---|
| 1 | ∞(pupil) | 30.000 | | | |
| 2 | ∞ | 1.000 | 1.51633 | 64.15 | |
| 3 | ∞ | 15.000 | | | |
| 4 | ∞ | 15.000 | | | 45.00° |
| 5 | 1077.009 | 5.000 | 1.51633 | 64.15 | |
| 6 | −132.813 (reflecting surface) | −5.000 | 1.51633 | 64.15 | |

-continued

| Surface No. | Radius of curvature | Surface separation | Refractive index | Abbe's No. | Tilt angle |
|---|---|---|---|---|---|
| 7 | 1077.009 | −15.000 | | | |
| 8 | ∞ (reflecting surface) | 22.040 | | | 45.00° |
| 9 | ∞(display device) | | | | |

As has been described above, it is possible according to the present invention to provide a compact and lightweight head- or face-mounted image display apparatus in which field curvature is reduced to improve visibility without using a relay optical system or a prism.

What we claim is:

1. A head- or face-mounted image display apparatus, comprising:

an image display device;

an optical system for leading an image displayed by said image display device to an observer's eyeball without effecting image formation on the way to said observer's eyeball; and means for retaining said image display device and said optical system on an observer's head or face, said optical system comprising a back-coated mirror and a plane-parallel plate having a semitransparent surface, wherein said back-coated mirror satisfies the following condition:

$$0<R/r<0.5 \qquad (4)$$

where R is a radius of curvature of a reflecting surface of said back-coated mirror, and r is a radius of curvature of a transmitting surface of said back-coated mirror at an obverse side thereof, and where curvature in a direction away from said observer's eyeball is defined as being positive.

2. A head- or face-mounted image display apparatus, comprising:

an image display device;

an optical system for leading an image displayed by said image display device to an observer's eyeball without effecting image formation on the way to said observer's eyeball, and means for retaining said image display device and said optical system on an observer's head or face, said optical system comprising a back-coated mirror and a plane-parallel plate having a semitransparent surface, wherein said optical system includes an optical element having a positive refracting power between said plane-parallel plate and said observer's eyeball, and said optical element, which has a positive refracting power, is a plano-convex lens having a plane surface directed toward said observer's eyeball.

3. A head- or face-mounted image display apparatus, comprising:

an image display device;

an optical system for leading an image displayed by said image display device to an observer's eyeball without effecting image formation on the way to said observer's eyeball; and means for retaining said image display device and said optical system on an observer's head or face, said optical system comprising a back-coated mirror and a plane-parallel plate having a semitransparent surface, wherein said optical system has a cover glass between said plane-parallel plate and said observer's eyeball, and said cover glass is tilted with respect to an optical axis.

4. A head- or face-mounted image display apparatus, comprising an image display device;

two, left and right, optical systems for leading an image displayed by said image display device to an observer's left and right eyes, respectively;

means for retaining said image display device and said two optical systems on an observer's head or face;

wherein the following condition is satisfied:

$$d<L<\infty \qquad (7)$$

where L is a vergence distance (image fusing position) given by optical axes of said two optical systems, and d is a distance to a virtual image of said image display device formed by said optical systems.

5. A head- or face-mounted image display apparatus according to claim 4, wherein the following condition is satisfied:

$$1.5d<L<4d \qquad (8).$$

6. A head- or face-mounted image display apparatus according to claim 4 or 5, wherein said image display device is shifted sideways such that a center of a virtual image of said image display device formed by each of said left and right optical systems shifts horizontally inward relative to a forward direction of said observer.

7. A head- or face-mounted image display apparatus according to claim 4 or 5, wherein said left and right optical systems and image display device are tilted inward.

8. A head- or face-mounted image display apparatus according to claim 4 or 5, wherein a center of said image display device and a center of the image displayed thereon are displaced relative to each other.

9. A head- or face-mounted image display apparatus wherein said optical element, which has a positive refracting power, is a plano-convex lens having a plane surface directed toward said observer's eyeball, comprising:

an image display device;

an optical system for leading an image displayed by said image display device to an observer's eyeball without effecting image formation on the way to said observer's eyeball; and means for retaining said image display device and said optical system on an observer's head or face, said optical system comprising a back-coated mirror and a plane-parallel plate having a semitransparent surface, and said optical system includes an optical element having a positive refracting power between said plane-parallel plate and said observer's eyeball, wherein the positive refracting power $\phi$ of said optical element satisfies the following condition:

$$0.3<\phi/\phi_t<0.45 \qquad (9)$$

where $\phi_t$ is a refracting power of the entire optical system.

* * * * *